(12) United States Patent
Brammer et al.

(10) Patent No.: US 9,555,410 B2
(45) Date of Patent: Jan. 31, 2017

(54) VALVE PLUG

(71) Applicants: Buerkert Werke GmbH, Ingelfingen (DE); Karlsruher Institut fuer Technologie, Karlsruhe (DE)

(72) Inventors: Marko Brammer, Ostfildern (DE); Christof Megnin, Speyer (DE)

(73) Assignees: BUERKERT WERKE GMBH, Ingelfingen (DE); KARLSRUHER INSTITUT FUER TECHNOLOGIE, Karlsruhe (DE)

( * ) Notice: Subject to any disclaimer, the term of this patent is extended or adjusted under 35 U.S.C. 154(b) by 840 days.

(21) Appl. No.: 13/760,583

(22) Filed: Feb. 6, 2013

(65) Prior Publication Data
US 2013/0199646 A1   Aug. 8, 2013

(30) Foreign Application Priority Data
Feb. 7, 2012   (DE) .................... 20 2012 001 202 U

(51) Int. Cl.
| F16K 31/08 | (2006.01) |
| B01L 3/00 | (2006.01) |
| F16K 99/00 | (2006.01) |
| F16K 31/02 | (2006.01) |

(52) U.S. Cl.
CPC ...... *B01L 3/502738* (2013.01); *B01L 3/50273* (2013.01); *F16K 31/025* (2013.01); *F16K 31/08* (2013.01); *F16K 99/0015* (2013.01); *F16K 99/0038* (2013.01); *F16K 99/0044* (2013.01); *B01L 2400/0616* (2013.01); *B01L 2400/0633* (2013.01); *Y10T 137/2213* (2015.04); *Y10T 137/2224* (2015.04)

(58) Field of Classification Search
CPC .................. B01L 3/502738; B01L 2400/0616; B01L 2400/0633; F16K 31/08; F16K 31/025; F16K 99/0038; F16K 99/0044; F16K 99/0015; Y10T 137/2224; Y10T 137/2213
USPC ............... 251/11, 291, 331, 367; 403/DIG. 1
See application file for complete search history.

(56) References Cited

U.S. PATENT DOCUMENTS

| 5,288,214 A | 2/1994 | Fukuda et al. |
| 5,802,704 A * | 9/1998 | Woody ..................... D05C 1/02 192/132 |
| 6,883,774 B2 * | 4/2005 | Nielsen .................... F15C 5/00 251/11 |
| 7,168,675 B2 | 1/2007 | Cabuz et al. |

(Continued)

FOREIGN PATENT DOCUMENTS

| DE | 102 49 937 | 5/2004 |
| DE | 202010010747 U1 * | 10/2010 ............. F16K 31/70 |

(Continued)

OTHER PUBLICATIONS

Machine Translation of DE202010010747U1 (dated Nov. 25, 2010); Accessed Jun. 27, 206.*

(Continued)

*Primary Examiner* — Craig Schneider
*Assistant Examiner* — Andrew J Rost
(74) *Attorney, Agent, or Firm* — Hauptman Ham, LLP

(57) ABSTRACT

An active fluid component (40) for connection with a substrate (10) has an interface which can be connected with the substrate (10) in a fluid-tight manner, and a magnet (42) arranged in the region of the interface.

20 Claims, 14 Drawing Sheets

(56) References Cited

U.S. PATENT DOCUMENTS

Figure 1:
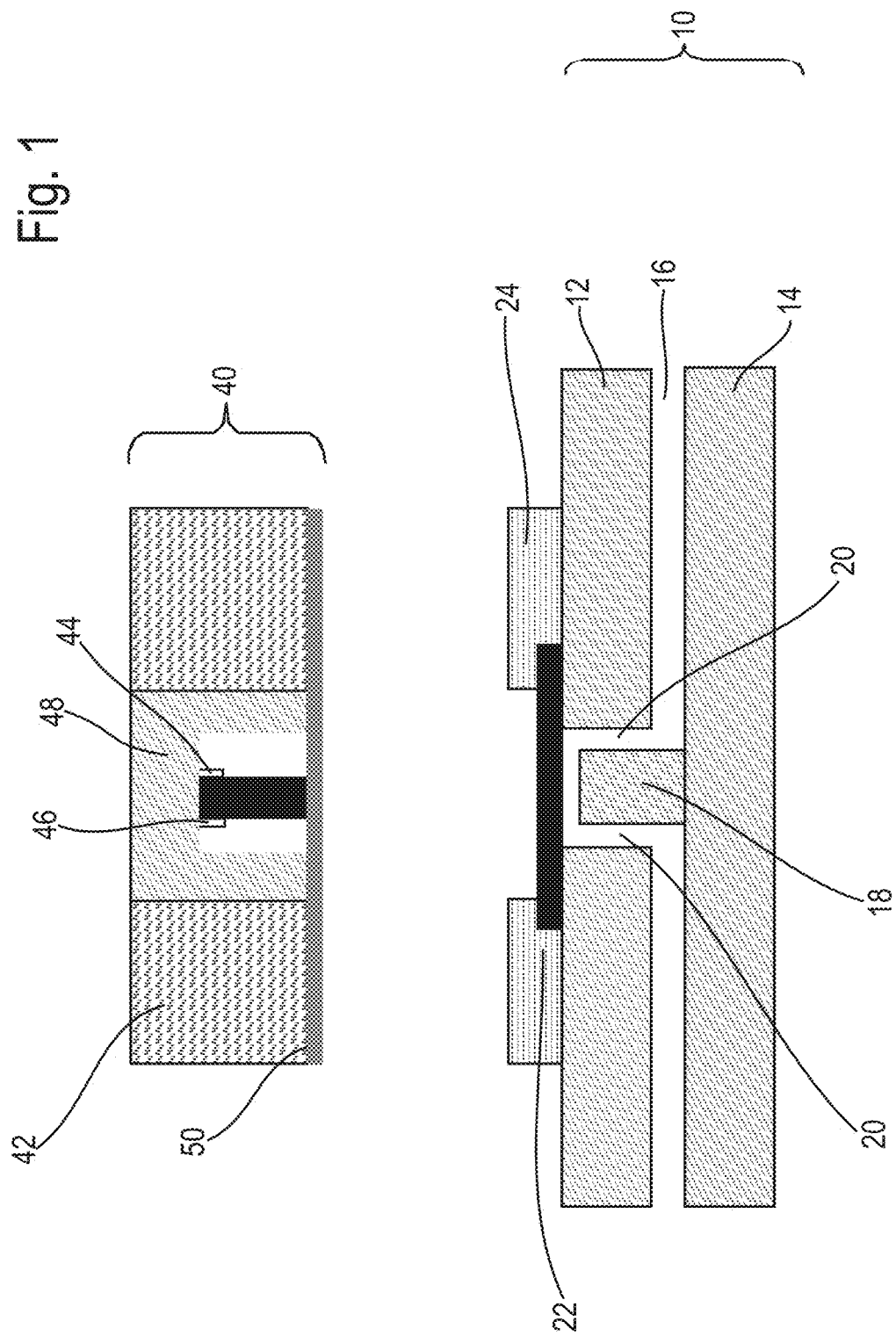

| | | | | |
|---|---|---|---|---|
| 7,302,970 | B2* | 12/2007 | Sugioka | B01J 19/0093 137/625.48 |
| 7,455,770 | B2* | 11/2008 | Gilbert | B01L 3/502715 204/450 |
| 7,790,325 | B2* | 9/2010 | Shioya | F16K 31/004 251/331 |
| 2005/0092662 | A1 | 5/2005 | Gilbert et al. | |
| 2009/0318312 | A1* | 12/2009 | McAvoy | B01L 3/50273 506/33 |
| 2010/0237166 | A1* | 9/2010 | Nelson | E03C 1/0404 239/11 |

FOREIGN PATENT DOCUMENTS

| | | |
|---|---|---|
| DE | 10 2010 032 799 | 10/2011 |
| WO | 2011/124384 | 10/2011 |

OTHER PUBLICATIONS

German Search Report dated Aug. 29, 2012 for German Patent Application No. 20 2012 001 202.9.
Chinese Office Action issued Dec. 10, 2015 in connection with the counterpart Chinese Patent Application No. 201310046113.0.
Chinese Office Action dated Jul. 29, 2016 in connection with the counterpart Chinese Patent Application No. 201310046113.0.

* cited by examiner

VALVE PLUG

CROSS REFERENCE TO RELATED APPLICATION

This application claims the priority of German Patent Application No. 20 2012 001 202.9, filed on Feb. 7, 2012 in the German Patent and Trade Mark Office (DPMA), the disclosure of which is incorporated herein in their entirety by reference.

The invention relates to an active fluid component which can be connected with a substrate. The invention further relates to an assembly having a substrate and a fluid component. The invention relates in particular to the field of large-scale integrated microfluidics, in which different fluid ducts, branches, couplings, mixer structures or similar are provided in a substrate (also referred to as fluid chip).

Large-scale integrated microfluidics is particularly suitable to selectively examine or analyze very small fluid quantities. The substrates used here can be manufactured at low cost and with a high precision, and only small quantities of reagents or sample material are necessary for the analysis, which leads to a high efficiency of the analysis. After the analysis, the substrates are disposed of in order to avoid cross-contaminations between different samples.

So far, active fluid components, for example valves or pumps, cannot be integrated at low cost into a substrate of this type. The substrates are thus usually configured as passive parts which are placed in a mostly very large and expensive peripheral device like a cartridge, and which are contacted or piloted there depending on the demand. Examples of such systems are the so-called Lab-on-a-Chip Systems or Micro Total Analysis Systems which permit to analyze very small fluid quantities in a highly sensitive and selective manner.

The substrates used here are mostly composed of polymer materials and are manufactured or molded by injection-molding, injection-stamping or hot stamping. Injection-molding permits to manufacture a large number of substrates in a cost-effective manner and with a constant quality. Hot stamping permits to manufacture parallel structures with a high aspect ratio and a high optical quality. However, up to now, it is not possible in both manufacturing types to integrate active components such as valves or pumps into the manufacturing process. The substrates or fluid chips are therefore contacted electrically and/or fluidically in a peripheral device via press-fit connections. A further possibility consists in guiding a fluid already present in a substrate through a fluidic duct structure by physical forces and in a determined flow chart, and to perform different analyses in spatially separated chambers.

There also exist different approaches to manufacture microvalves which can be used in substrates of this type. One approach consists in manufacturing microvalves on a common substrate (mostly silicon) by means of hybrid manufacture in a pick-and-place process or in a batch process. There also exist tests how polymer valves can be manufactured parallel to a common polymer fluidic switching plate. The drawback of the parallel manufacture and integration however consists in that the valve cannot be connected in a reversible manner with the substrate. The malfunction of an individual valve therefore means the failure of the overall system.

The object of the invention is to provide an active fluid component which can be connected in a reversible manner with a substrate. The object of the invention also consists in providing an assembly having a substrate and a fluidic component detachably connected with the substrate.

To achieve this object, an active fluid component for connection with a substrate is provided, having an interface which can be connected in a fluid-tight manner with the substrate, and a magnet arranged in the region of the interface. The invention is based on the basic idea to configure the active fluid component, for example a pump, a switching valve or a control valve, as an external part which can be detachably connected in a reversible manner with the substrate. To this end, the magnet is provided which generates sufficiently high magnetostatic attractive forces by means of which a fluid-tight connection can be realized for the desired application cases. In case of need, for example after an analysis of a fluid, the active fluid component is separated from the substrate and can be reused, whereas the substrate is disposed of.

According to an advantageous configuration, it is provided that the magnet is a ring magnet. This permits to completely or partially accommodate the active fluid component in the interior of the ring magnet. A ring magnet furthermore ensures in cooperation with a suitable counterpiece an automatic centering.

Alternatively, the magnetic connection may also be achieved by cubic magnets in the corner positions.

According to a configuration of the invention, it is provided that an actuator, in case the active fluid component is a switching valve, is arranged within the ring magnet. In this way, a very compact structure is achieved in which the actuator is arranged in a protected manner.

It is preferably provided that provision is made at the interface for a seal covering the actuator. In this way, the latter is reliably protected against dirt.

The seal is preferably attached to a ring surface of the ring magnet. In this way, a continuous, flat interface is achieved.

According to a configuration of the invention, it is provided that the actuator is arranged on the side of the ring magnet facing away from the interface. This is advantageous if the space available within the ring magnet is not sufficient to receive the active parts of the active fluid component.

It is preferably provided that provision is made for a seal between the ring magnet and the actuator such that the actuator is protected against dirt.

If the actuator is arranged on the rear side of the ring magnet, two connecting ducts leading from the interface to the seal preferably extend through the interior of the ring magnet, at least one of the connecting ducts having a valve chamber at the switching diaphragm. By an appropriate configuration and dimensioning of the valve chamber and of the connecting ducts, the pressure ratios at the switching valve can be adjusted in the desired manner. A certain pre-stressing force can for example be generated, which acts on a switching diaphragm when the valve is closed due to the fluidic pressure applied.

According to a configuration, it is provided that the seal is configured as a switching diaphragm which is adapted to cooperate with a valve seat. In this configuration, the seal which seals the actuator with respect to the medium to be switched thus has a double function as it also directly serves to switch the fluid.

According to an alternative configuration, a separate switching diaphragm is provided which is adapted to cooperate with a valve seat. This permits to configure the switching diaphragm and the seal of different materials so that they can be adapted in an optimal way to the respective requirements.

According to a configuration of the invention, it is provided that the actuator is made of a shape memory material and that a heating device is associated therewith. In this way, comparatively large switching forces can be generated with very small dimensions.

The heating device can be configured directly in the actuator as a resistance heating. Alternatively, a separate heating device can be used.

According to a configuration, it is provided that the switching valve is a normally closed switching valve. Such a switching valve requires an active piloting to be opened.

A spring or a magnet is preferably provided which cooperates with the actuator. This ensures that the valve is reliably closed and opens only after an active piloting.

According to an alternative configuration, it is provided that the switching valve is normally open. This embodiment is in particular advantageous in security valves or similar.

The actuator is preferably a foil made of a shape memory material which has a planar shape in the initial state, which is deformed by an external force and attempts in the heated state to return to the initial state. Depending on the configuration of the valve, this travel can be used to free or close the valve seat.

According to a configuration of the invention, it is provided that the magnet is a NdFeB magnet having a diameter of less than 10 mm. Such a magnet offers high retaining forces for very compact dimensions.

To achieve the object mentioned above, an assembly having a substrate and a fluid component of the type described above is also provided according to the invention, a retaining piece with which the magnet cooperates being arranged at the substrate so that the fluid component is detachably fastened to the substrate. Regarding the resulting advantages, reference is made to the above explanations.

According to a configuration of the invention, it is provided that the retaining piece is a metal disk, in particular a steel disk. This disk is adapted to be integrated into the substrate or to be firmly arranged thereon at low cost.

It is preferably provided that a seal is arranged in the region of the retaining piece. This ensures a sealing between the active fluid component and the substrate.

The seal can for example be arranged within the metal disk, and can in particular be anchored to the inner circumference of the metal disk. As a result, the seal is mechanically well protected.

The material Hala-TFO-N230-Si has proved its worth as a material for the seal, which can be cut in a reliable and precise manner by laser and fulfils the tightness requirements. Alternatively, it is also possible to use a sealing material made of EPDM or NBR.

According to a configuration of the invention, it is provided that the fluid component is a switching valve and in that the seal is configured as a sealing diaphragm which is adapted to cooperate with at least one valve seat formed in the region of the interface. The necessary tightness is in this way ensured with low expenditure.

Alternatively, it is provided that the seal has openings through which fluid ducts of the substrate are connected with connecting ducts of the fluid component. In this case, the seal serves merely for a sealing between the substrate and the fluid component.

According to a preferred embodiment of the invention, the substrate is a fluidic switching plate having a plurality of fluid ducts. The latter can be manufactured using an injection-molding method or a hot stamping method and may be configured as a one-way component.

Figure 2:
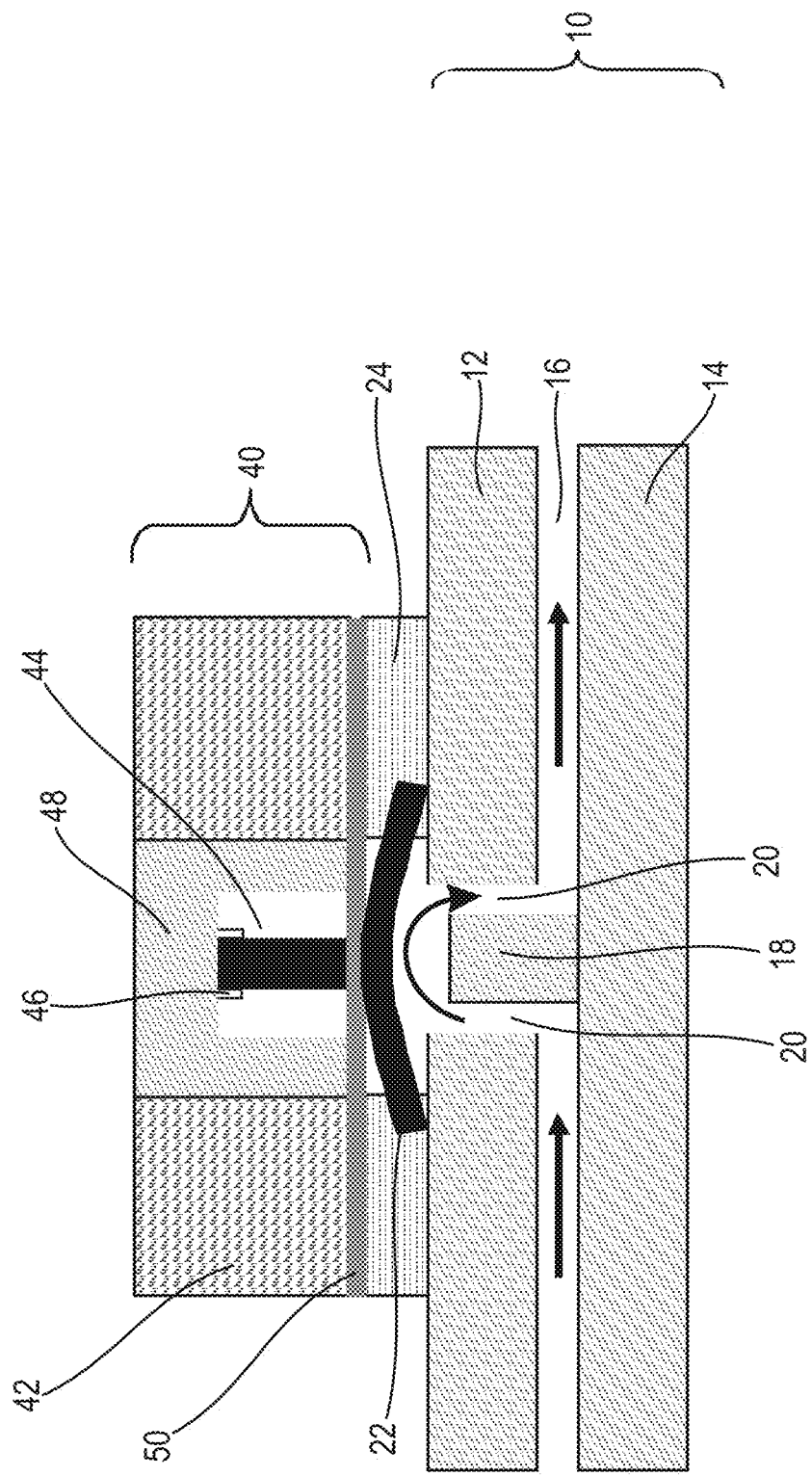
Figure 3:
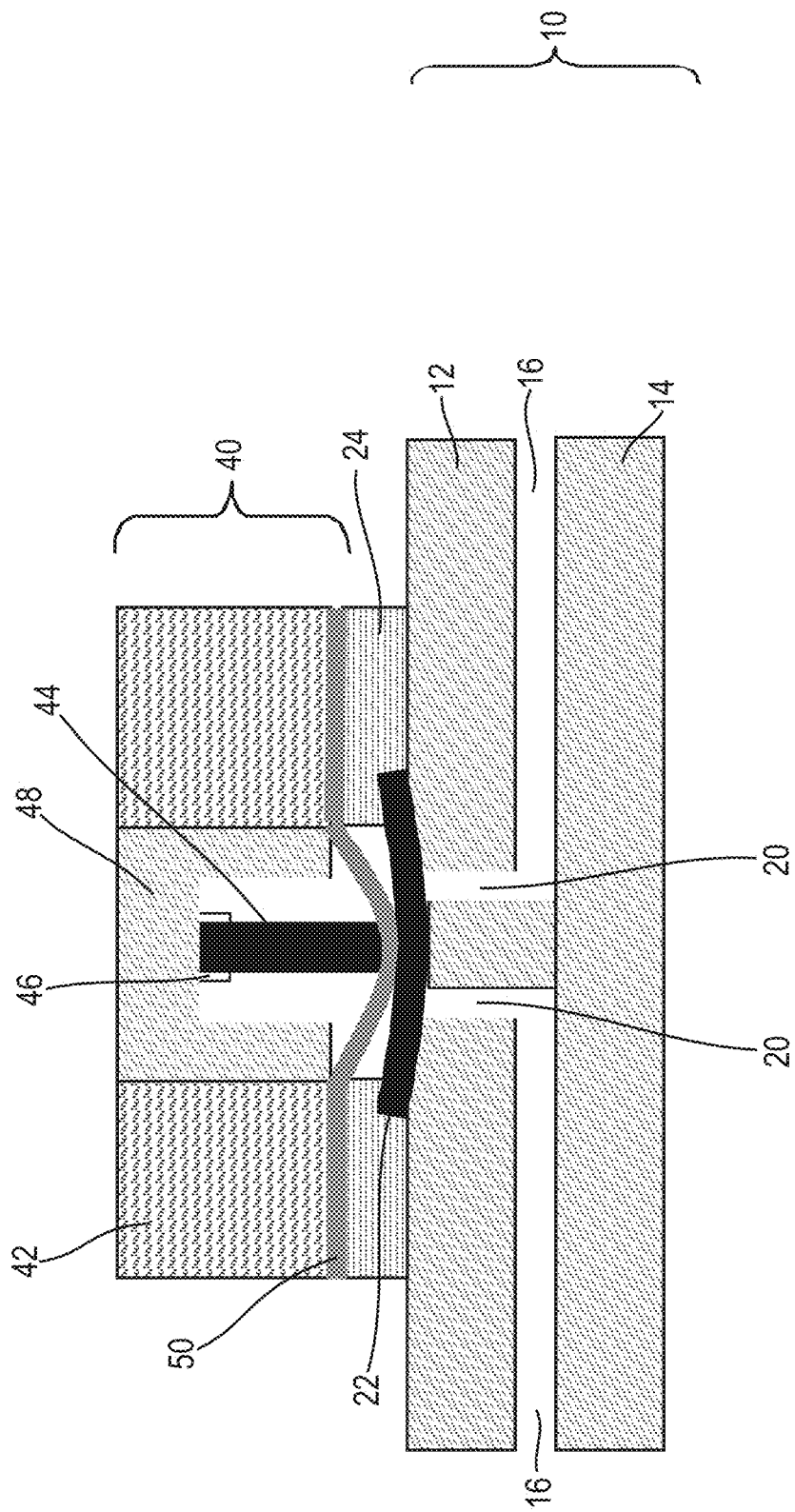
Figure 4:
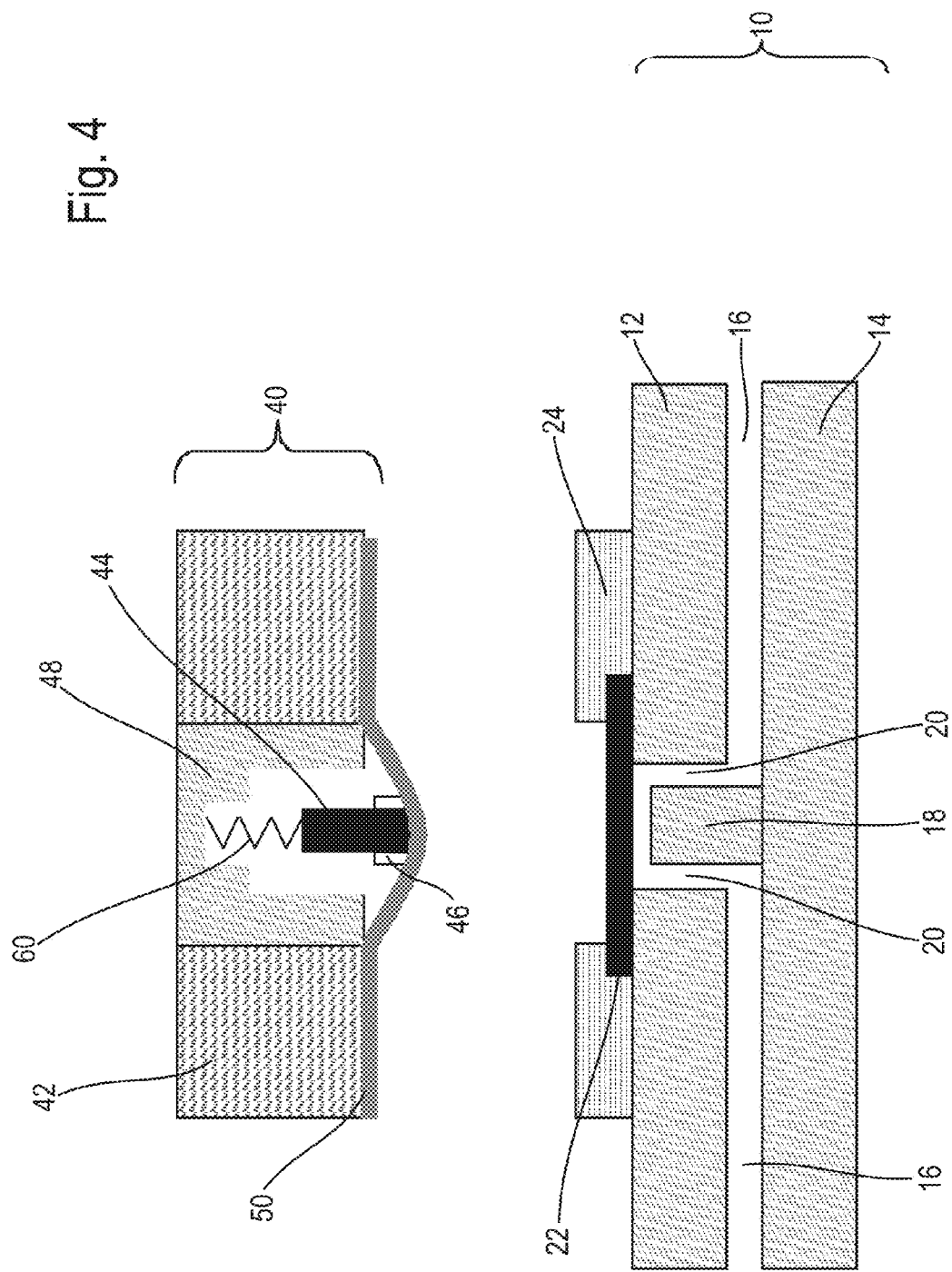
Figure 5:
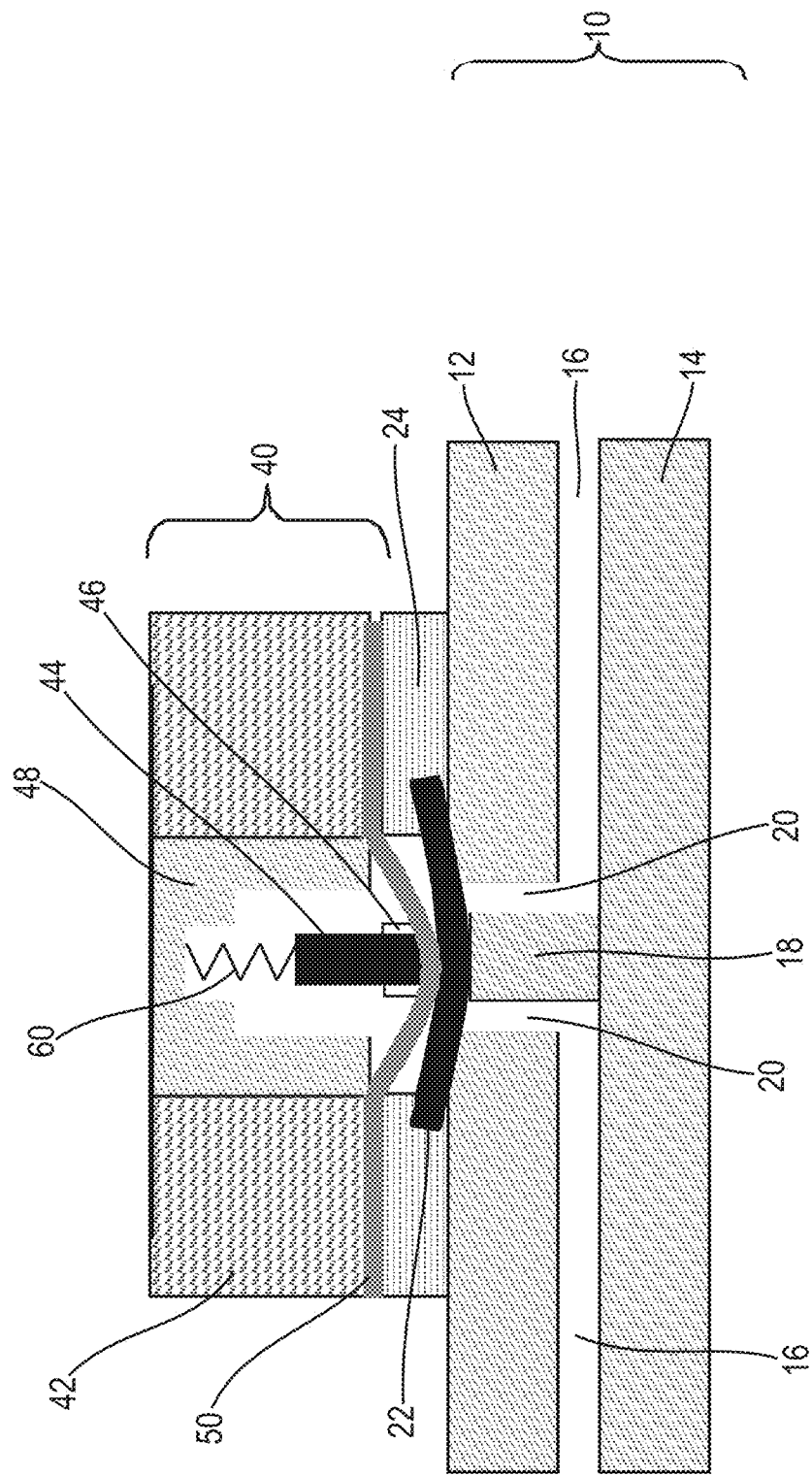
Figure 6:
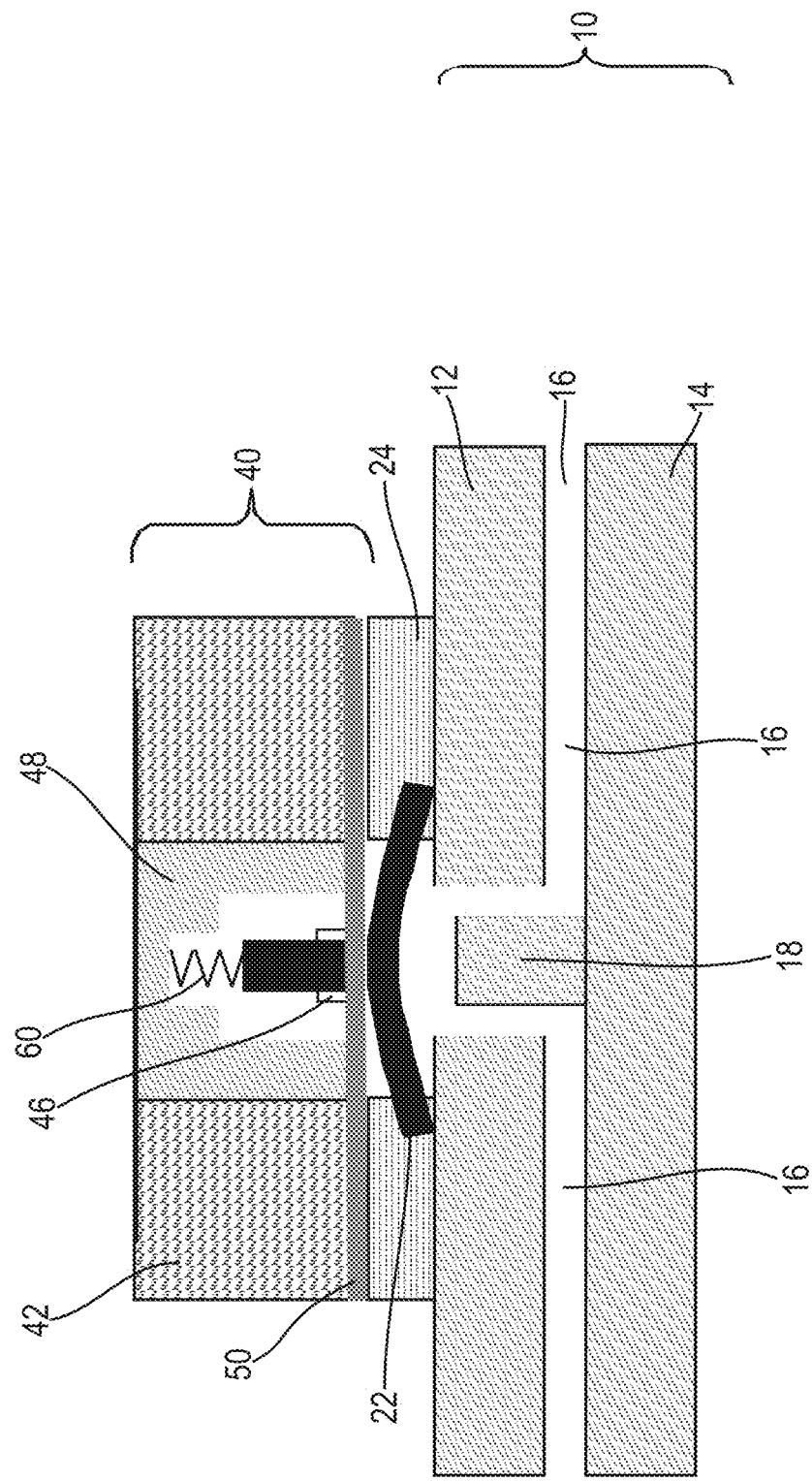
Figure 7:
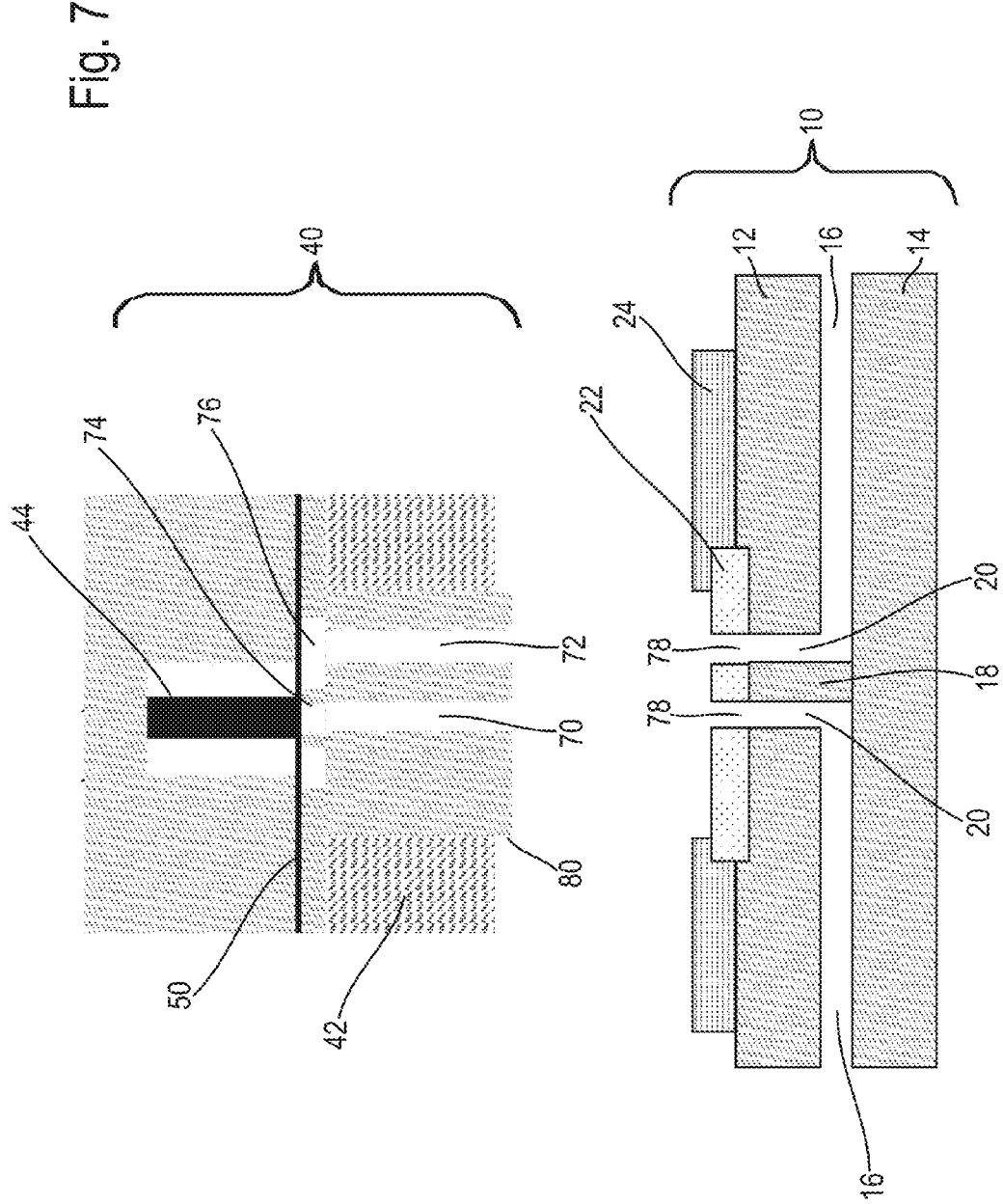
Figure 8:
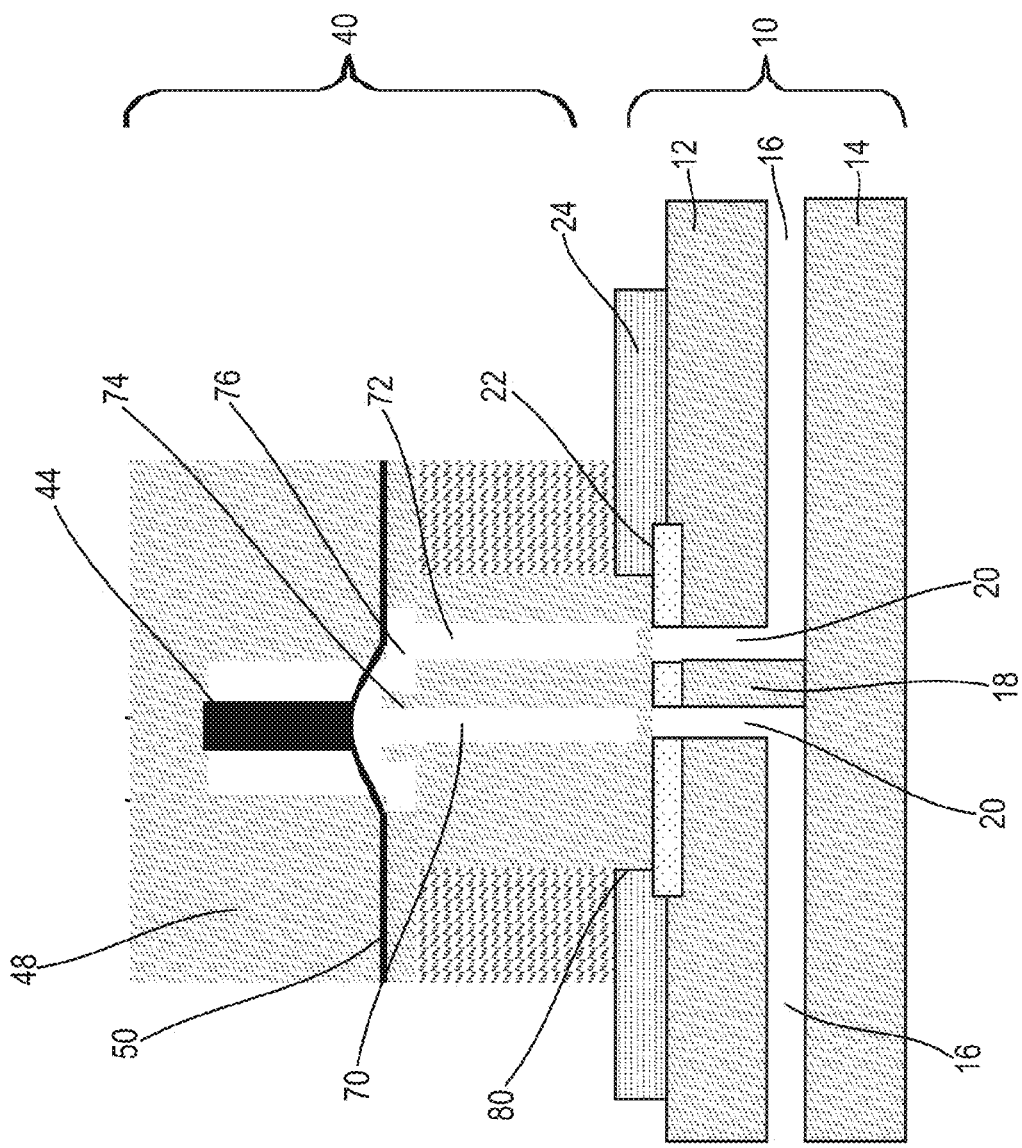
Figure 9:
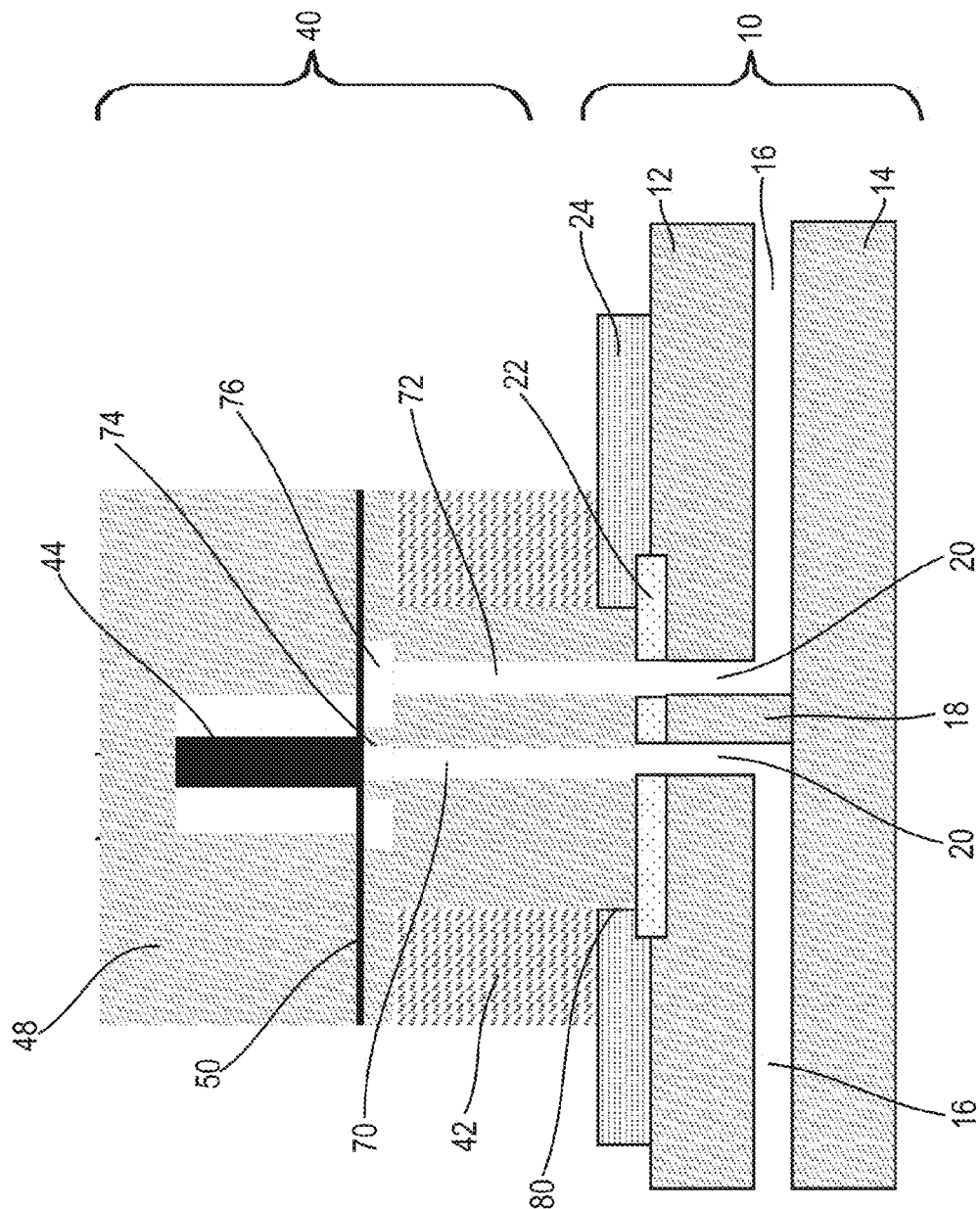
Figure 10:
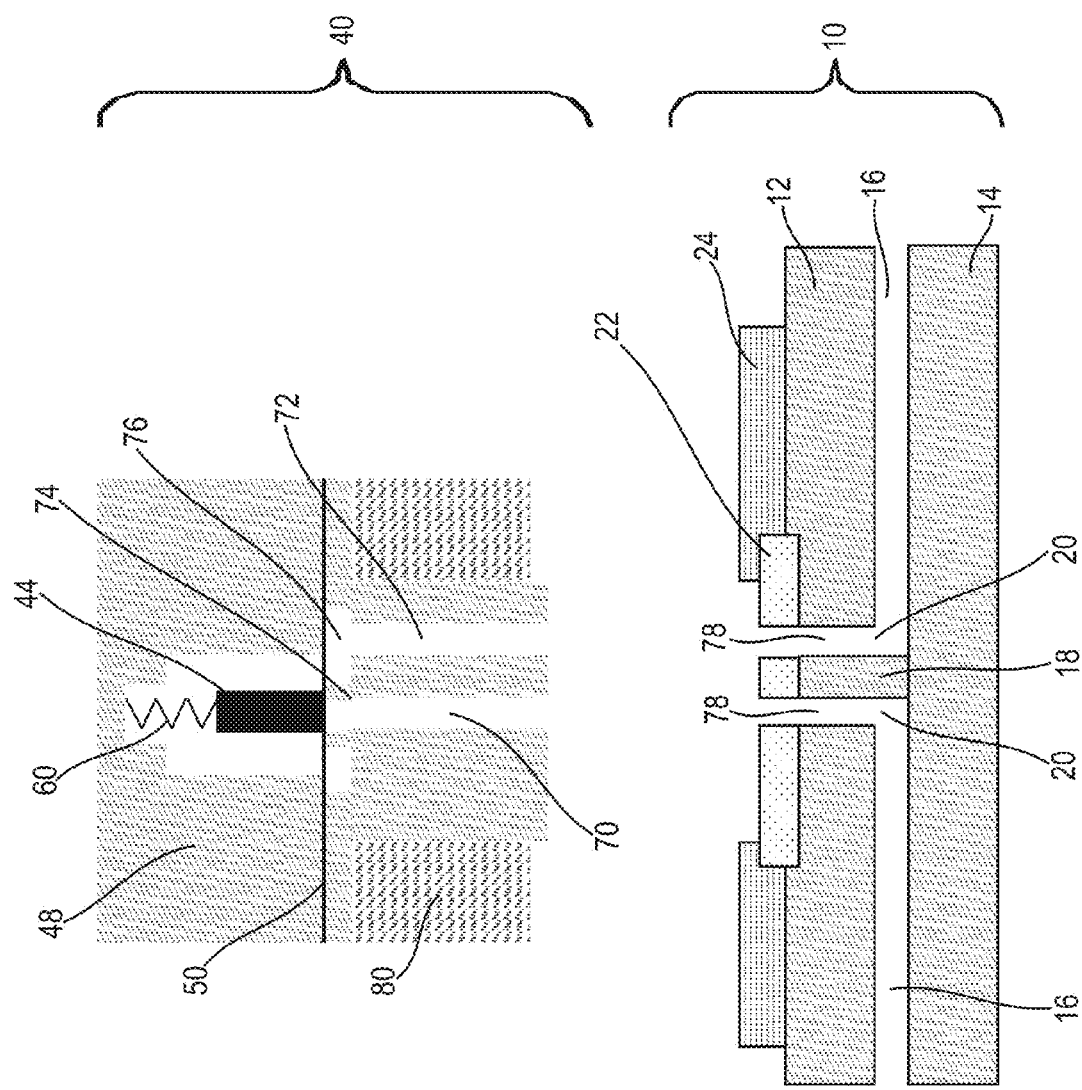
Figure 11:
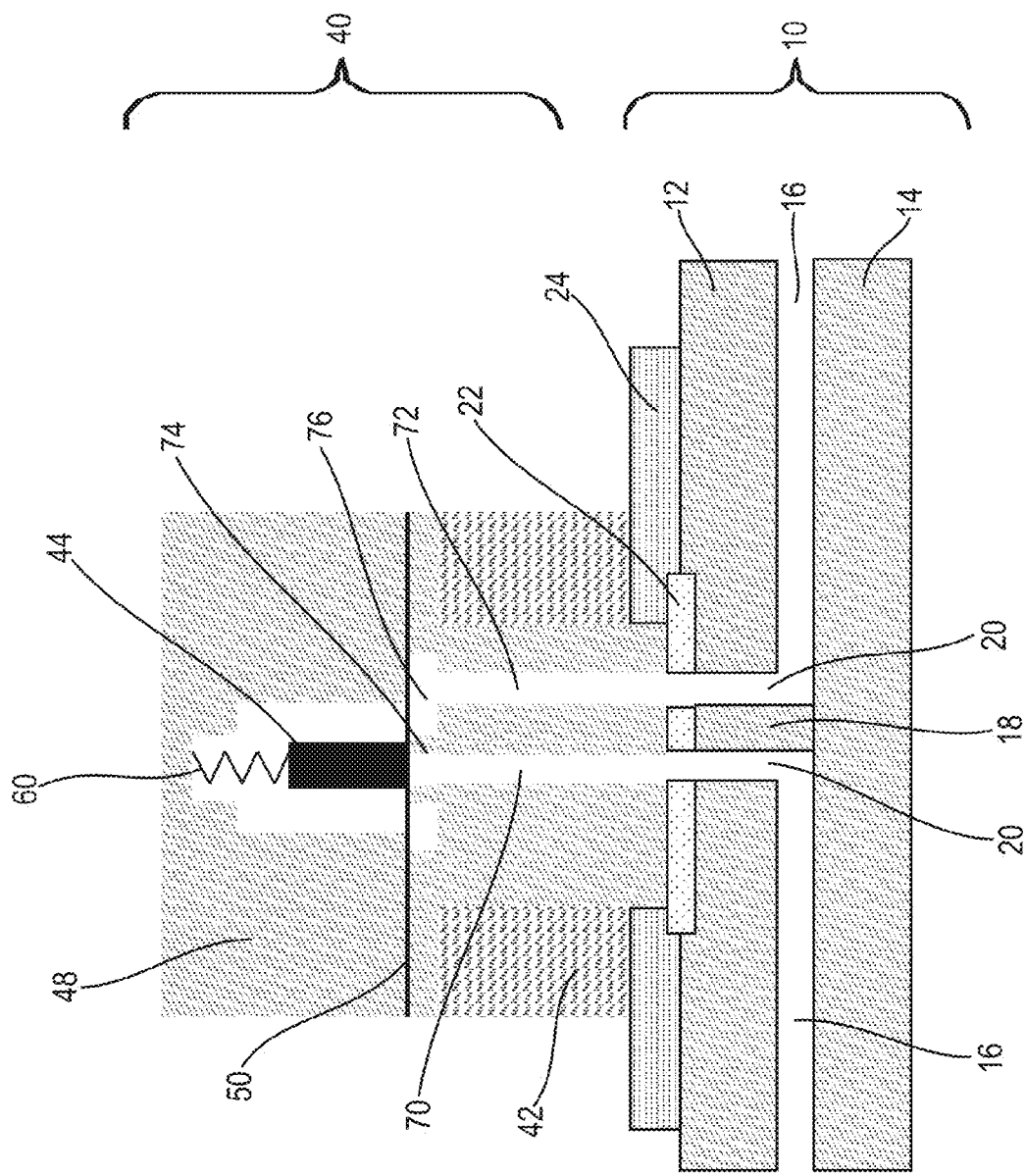
Figure 12:
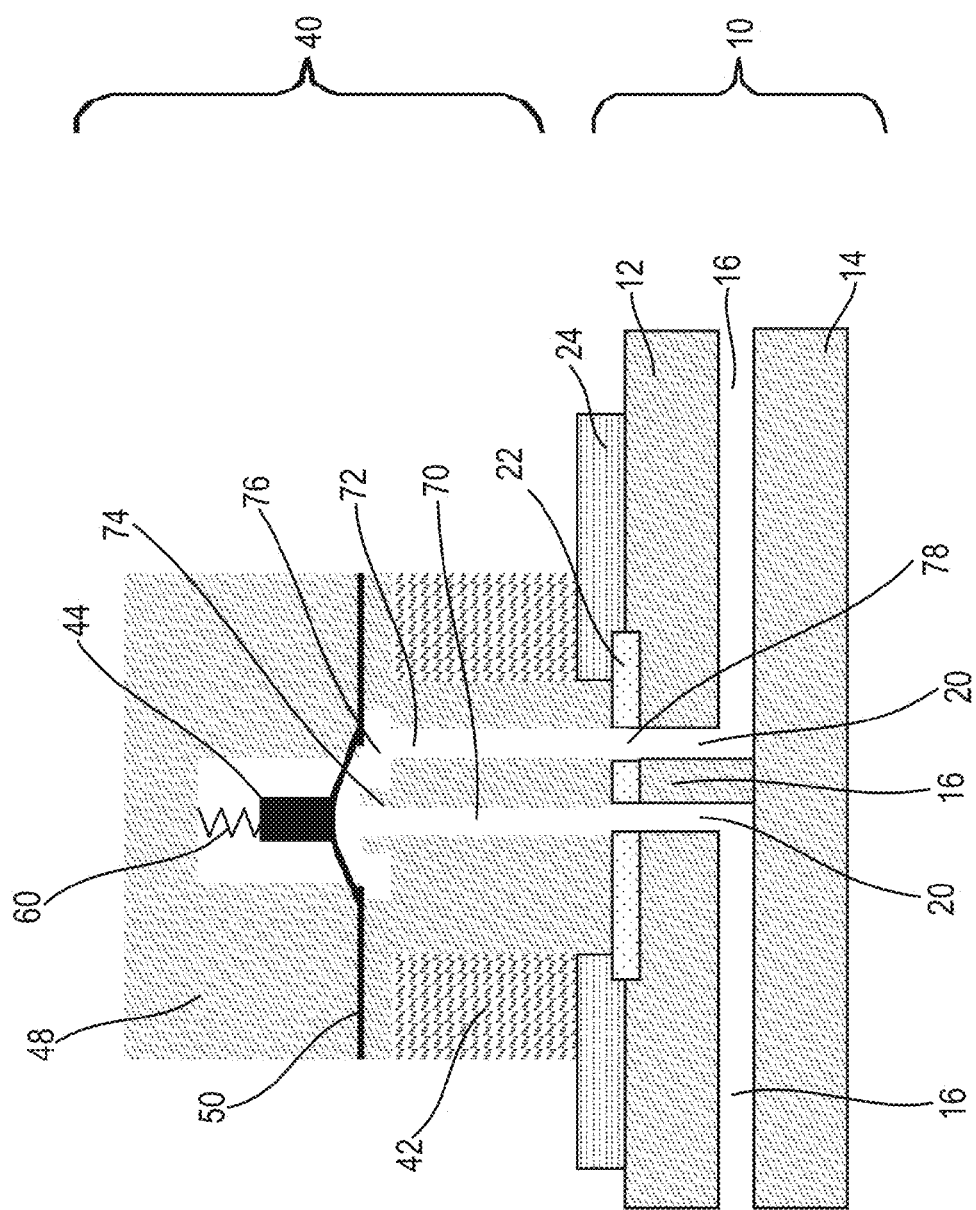
Figure 13:
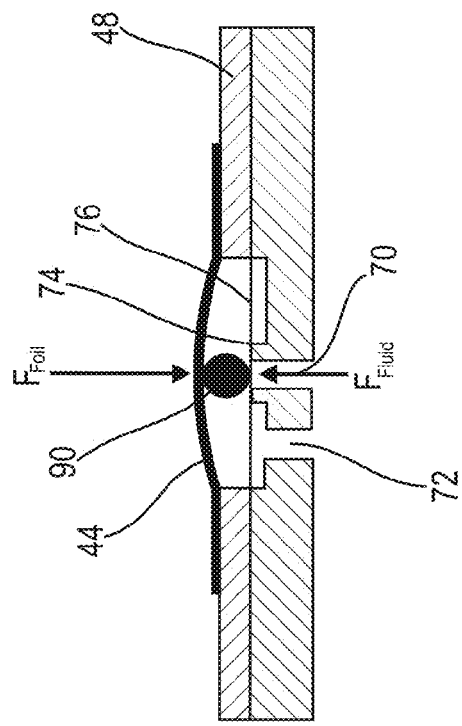
Figure 14:
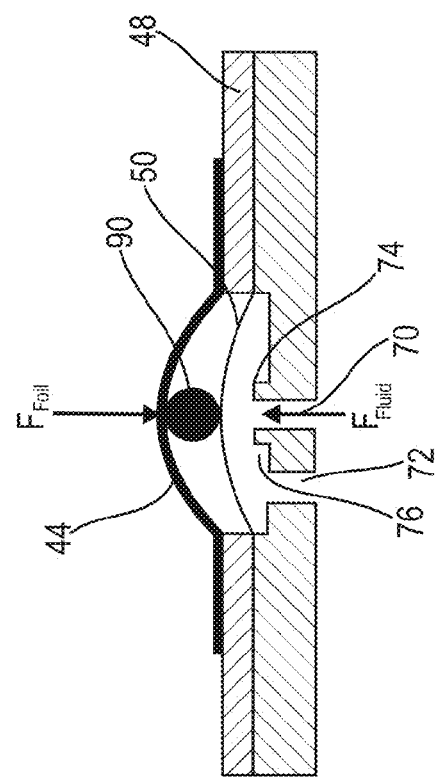
Figure 15:
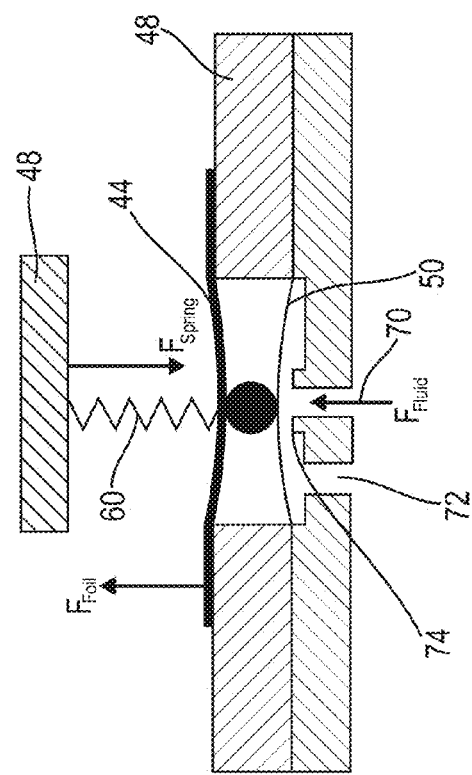
Figure 16:
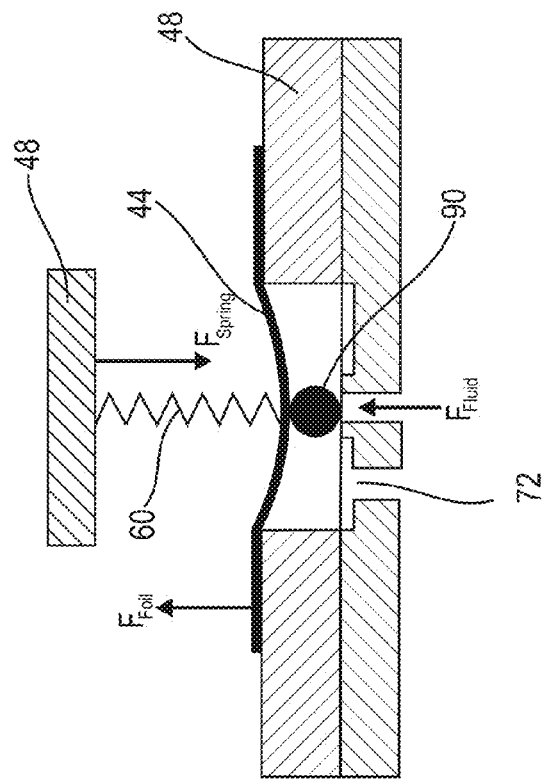

The invention will be described below with reference to different embodiments which are illustrated in the accompanying drawings, which show:

FIG. 1 schematically a substrate and an active fluid component that can be fitted thereto;

FIG. 2 the parts of FIG. 1 in the mounted state, a normally open valve being formed;

FIG. 3 the assembly of FIG. 2, the valve being closed;

FIG. 4 a substrate and an active fluid component that can be fitted thereto according to a second embodiment;

FIG. 5 the parts of FIG. 4 in the mounted state, a normally closed valve being formed;

FIG. 6 the assembly of FIG. 5, the valve being open;

FIG. 7 a substrate and an active fluid component that can be fitted thereto according to a third embodiment;

FIG. 8 the parts of FIG. 7 in the mounted state, a normally open valve being formed;

FIG. 9 the assembly of FIG. 8, the valve being open;

FIG. 10 a substrate and an active fluid component that can be fitted thereto according to a fourth embodiment;

FIG. 11 the parts of FIG. 10 in the mounted state, a normally closed valve being formed;

FIG. 12 the assembly of FIG. 11, the valve being open;

FIG. 13 in detail the actuator of a normally open switching valve in the initial state;

FIG. 14 the actuator of FIG. 13 in the piloted state;

FIG. 15 in detail the actuator of a normally closed valve in the initial state; and FIG. 16 the actuator of FIG. 15 in the piloted state.

FIG. 1 shows a substrate 10 which is configured as a fluidic switching plate.

It is composed of two thin polymer plates 12, 14 between which fluid ducts 16 are arranged. The fluid ducts 16 are interrupted at different points (cf. block 18), and at these points, through holes 20 are provided in one of the plates (here plate 12) so that the fluid ducts can be connected with each other in a controlled manner on both sides of the block 18.

A seal 22 adapted to cooperate with the block 18 which then acts as a valve seat is arranged in the region of the through holes 20. The seal/switching diaphragm 22 is arranged within a steel disk 24 which due to its properties acts as a soft-magnetic retaining piece. The seal or switching diaphragm 22 is specifically clamped to the inner circumference of the steel disk 24 below a shoulder formed there, so that a sealing on the upper surface of the plate 12 in the region of the through holes 20 is ensured.

An active fluid component 40 which is here configured as a switching valve may be placed on the substrate 10 and specifically on the retaining piece 24. The active fluid component 40 contains a magnet 42 which is here configured as a ring magnet made of NdFeB. It has a diameter of less than 10 mm, and its dimensions are adapted to the dimensions of the steel disk 24. In a specific embodiment, an outer diameter of 8 mm, an inner diameter of 4 mm and a height of 3 mm may be used.

In the variant embodiment shown in FIG. 3, an actuator 44 is provided which is entirely arranged in the interior of the ring magnet 42. The actuator 44 is made of a shape memory material, and a heating device 46 is associated therewith so that the actuator 44 may be heated beyond a transition temperature. Here, the actuator 44 and the heating device 46 are enclosed in a housing 48 which tightly closes the active fluid component 40 on its rear side.

On the opposite side, i.e. on the side facing the substrate 10, the interface provided for connection with the substrate 10 is covered by means of a seal 50 which extends over the actuator 44 and also over the ring surface of the magnet 42. The seal 50 as a thin laser-cut disk may be made of Hala-TFO-N130-Si. This material distinguishes itself by a high chemical resistance and a high elasticity. In conjunction with the dimensions mentioned above of the ring magnet, a wall thickness of 230 µm may be used. Alternatively, a thin foil of polyimide having a thickness in the range of 7 µm to 30 µm may also be used as a seal/switching diaphragm.

In FIG. 2, the active fluid component 40 is shown placed on the substrate 10. Due to the magnetostatic attractive forces between the ring magnet 42 and the steel disk 24, the seal 50 is elastically deformed so that a good surface sealing is obtained. Due to the configuration and dimensions of the actuator 44, the seal/switching diaphragm 22 does not rest on the block 18 so that an unhindered fluidic connection between the two through holes 20 and therefore from the fluid duct 16 on one side of the block 18 to the fluid duct on the other side is possible (cf. the drawn arrows F for the fluid flow). A normally open valve is thus formed.

FIG. 3 illustrates the valve of FIG. 2 in a closed state. This state is achieved in that the actuator 44 is heated by means of the heating device 46 beyond its transition temperature, so that its geometry changes. In the variant schematically illustrated here, the actuator 44 is extended, so that it presses the seal/switching diaphragm 22 downwards against the block 18 so as to close the connection from one through hole 20 to the second. The seal 50 is thus elastically deformed, which however does not impede the switching operation due to its configuration.

Here, the substrate 10 and the active fluid component 40 are illustrated only very schematically.

The plates 12, 14 of the substrate 10 can be manufactured using a molding process (injection-molding, hot stamping) or using a machining process (drilling, milling). After the manufacture, both plates 12, 14 can be connected with each other by a bonding method (thermally, chemically) or by laser welding. By the choice of the polymer, the substrate may be adapted to different conditions and requirements, such as the chemical resistance and the temperature stability. The substrate can be contacted fluidically with one or two respective ports in all four directions in space. For contacting functional modules (sensors, controllers, mixers), further fluidic ports may be provided which lead out of the plane.

The switching valve 40 can be composed of three polymer main parts, namely a housing, an actuator support and a cover, which are manufactured in a metal removing manner (drilling, milling) or in a molding process (hot stamping, injection-molding). For the separation of the media, the housing is sealed by the seal 50 which acts as a diaphragm. The actuator support serves to the thermal decoupling between fluidics and the actuator technology, to fix the actuator mechanically, and, if necessary, to receive a spherical valve tappet. Receptions for the electrical contact by means of spring contacts and cooling elements to increase the dynamics of the valve are located in the cover. These parts are not represented in the schematic drawings. The individual valve elements can be screwed to each other.

In the manufacture of the switching valve, the ring magnet 42 can be firmly connected with the housing using a bonding method, by injection around the latter during injection-molding, or by dispersion of magnetic particles during hot stamping.

The seal 22 is laser-cut so that it can be manufactured with very accurate dimensions. Alternatively, it is possible that the seal is punched. The steel disk 24 can be firmly connected with the substrate 10 by means of a threaded joint or an adhesive joint.

FIGS. 4 to 6 show a configuration which basically corresponds to the embodiment known from FIGS. 1 to 3 as to its structure. The same reference numerals are used for the parts used in the second configuration, and in this respect, reference is made to the explanations above.

In contrast to the first embodiment, a normally closed valve is however used in the configuration according to FIGS. 4 to 6, i.e. a valve which closes a fluid connection associated therewith in the non actuated state. To this end, a compression spring 60 is provided here, which presses the actuator and thus also the seal 50 towards the block 18 acting here as a valve seat. As a result, the seal/switching diaphragm 22 is pressed against the block 18, and the connection from the fluid duct 16 on one side of the block 18 to the fluid duct 16 on the other side is closed (cf. FIG. 5). The prestress of the compression spring 60 may be adjusted by an adjusting screw (not illustrated). As an alternative to the spring, the actuator can also be acted upon by a magnetic force. To this end, a magnet (or a plurality of magnets) may be arranged appropriately.

When the heating device 46 is activated, the actuator 44 is heated beyond its transition temperature so that the switching valve is switched over (cf. FIG. 6), as a result of which the seal/switching diaphragm 22 is no longer pressed against the block 18. A fluid connection is thus released between the two fluid ducts 16 on the one and on the other side of the block 18.

FIGS. 7 to 9 show a configuration according to a third embodiment working similar to the embodiment shown in FIGS. 1 to 3. As to the parts known from the preceding embodiments, the same reference numerals are used, and in this respect, reference is made to the above explanations.

The difference between the first and the third embodiment consists in that in the third embodiment, the actuator is arranged on the "rear side", i.e. on the side facing away from the substrate 10, rather than within the ring magnet 42. Here, two connecting ducts 70, 72 extend through the interior of the ring magnet 42, of which one (connecting duct 70) is arranged centrally and is surrounded by a valve seat 74 at its end facing the actuator 44, whereas the other (connecting duct 72) runs on the side of the actuator into an annular valve chamber 76 surrounding the valve seat 74. A seal 50 is also arranged here between the valve seat 74 and the valve chamber 76 on the one hand, and the actuator 44, on the other hand, the seal ensuring a medium-tight separation.

On the side of the substrate 10, the seal 22 is provided with openings 78 which are associated with the through holes 20. In the mounted state, a centering projection 80 rests on the seal 22, the projection being formed in one piece with the material which fills the interior of the ring magnet 42 and in which the connecting ducts 70, 72 are formed. The centering projection 80 projects in the axial direction from the lower ring surface of the ring magnet 42 and is received in the interior of the steel disk 24 (cf. FIG. 8), additional positioning formations being provided which ensure that the active fluid component 40 is placed in the right position on the substrate 10 and that the connecting duct 72 is aligned with the through hole 20 associated therewith.

Due to the magnetostatic attractive forces between the ring magnet 42 and the steel disk 24, the actuator 44 is firmly urged against the substrate, the projection 80 compressing the seal 22 elastically so that a good fluid-tight connection is ensured. As the seal 22 is part of the substrate and thus a one-way product, it can also be allowed that the seal 22 is slightly squeezed by the occurring forces.

In the un-piloted state (cf. FIG. 8), the switching valve is open so that a fluid connection is possible from a fluid duct 16 via the associated through hole 20, the connecting duct 70 via the valve seat 74 into the valve chamber 76, and from there via the connecting duct 72 and the other through hole 20 into the second fluid duct 16, and vice versa. The seal 50 is here lifted off from the valve seat 74 by the fluid pressure applied.

When the switching valve 40 is piloted and the actuator 44 is heated beyond its transition temperature, it expands so as to press the seal 50 serving here as a switching diaphragm against the valve seat 74 with considerable force. As a result, the connection between the two fluid ducts 16 is closed.

When the fluid pressure is applied to the connecting duct 72 when the switching valve is closed, it is possible to adjust the force acting on the diaphragm 50 by the configuration and dimensioning of the valve chamber 76.

FIGS. 10 to 12 show a fourth embodiment which corresponds to the embodiment according to FIGS. 4 to 6 as to the switching behavior, and which corresponds to the embodiment according to FIGS. 7 to 9 as to the general structure. The same reference numerals are used for the parts known from the preceding embodiment, and in this respect, reference is made to the above explanations.

Like in the embodiment according to FIGS. 4 to 6, a compression spring 60 is also used here, which ensures that the switching valve is normally closed, thus that the seal/switching diaphragm 50 presses against the valve seat 74 when the switching valve is not piloted.

FIGS. 13 and 14 show a possible configuration of the actuator 44 for a normally open valve. The actuator 44 is composed of a thin structured foil made of a shape memory alloy. A nickel-titanium alloy is particularly suitable as material. A valve tappet 90 which may have a spherical configuration is arranged between the actuator 44 and the seal/switching diaphragm 50. The foil of the actuator 44 is configured such that in the initial state, when merely the fluid pressure is applied, it can yield away from the valve seat 74, the centre of the foil of the actuator 44 being driven back the furthest. In this state, the seal/switching diaphragm 50 and the valve tappet 90 are away from the valve seat 74. When the actuator 44 is heated beyond the transition temperature, the actuator 44 tends back to its flat shape, as a result of which the valve tappet and thus also the seal/switching diaphragm 50 are pressed against the valve seat 74 (cf. FIG. 14). The force acting here is higher than the force resulting from the applied fluid pressure, so that the valve is closed.

FIGS. 15 and 16 show an actuator for a normally closed valve. Here, the actuator 44 is mounted in an inverse orientation. The region pressed out of the plane of the foil of the actuator 44 faces the valve seat 74. The spring 60 is provided to ensure in the initial state that the actuator 44 presses the seal/switching diaphragm 50 reliably against the valve seat 74 via the valve tappet 90. The prestress of the spring can be adjusted by means of an adjusting screw.

When the actuator 44 is heated beyond its transition temperature, it is deformed so as to have a flat shape. The spring 60 is compressed, and the valve tappet 90 and thus also the seal/switching diaphragm 50 can be lifted off from the valve seat 74 under the effect of the applied fluid pressure (cf. FIG. 16). The switching valve is then open so that the fluid can flow from the connecting duct 70 to the connecting duct 72.

The invention is described above with reference to a switching valve which is used as a fluid component 40. Instead of a switching valve, the active fluid component may also be a pump, a control valve or similar.

The invention claimed is:

1. An active fluid component for connection with a substrate, the active fluid component comprising:
    an interface configured to be connected with the substrate in a fluid-tight manner;
    a ring magnet arranged in a region of the interface; and
    a switching or control valve having an actuator arranged in an interior of the ring magnet,
    wherein the interface comprises a seal configured to cover the actuator and extend between a ring surface of the ring magnet and a surface of the substrate.

2. The fluid component according to claim 1, wherein the seal is attached to the ring surface of the ring magnet.

3. The fluid component according to claim 1, wherein the seal is configured as a switching diaphragm which is adapted to cooperate with a valve seat.

4. The fluid component according to claim 1, further comprising:
    a separate switching diaphragm configured to cooperate with a valve seat.

5. The fluid component according to claim 1, further comprising:
    a heating device associated with the actuator.

6. The fluid component according to claim 5, wherein the heating device comprises a resistance configured to directly heat a shape memory material.

7. The fluid component according to claim 1, wherein the fluid component is a normally closed switching valve.

8. The fluid component according to claim 7, further comprising:
    an adjustable spring configured to cooperate with the actuator.

9. The fluid component according to claim 7, further comprising:
    a magnet acting on the actuator.

10. The fluid component according to claim 1, wherein the fluid component is a normally open switching valve.

11. The fluid component according to claim 1, wherein the ring magnet is a NdFe-B magnet having a diameter of less than 10 mm.

12. The assembly according to claim 1, wherein a steel retaining disk comprises a soft magnetic material.

13. The assembly according to claim 1, further comprising:
    a seal arranged in a region of a steel retaining disk.

14. The assembly according to claim 13, wherein the seal is anchored to an inner circumference of the steel retaining disk.

15. The assembly according to claim 13, wherein the seal comprises Hala-TFO-N230-Si.

16. The assembly according to claim 13, wherein the seal is configured as a switching diaphragm which is adapted to cooperate with at least one valve seat formed in a region of the interface.

17. The assembly according to claim 1, wherein the substrate is a fluidic switching plate having a plurality of fluid ducts.

18. An active fluid component for connection with a substrate, the active fluid compoment comprising:
    an interface configured to be connected with the substrate in a fluid-tight manner;
    a ring magnet arranged in a region of the interface having an actuator arranged in an interior of the ring magnet,
    wherein the actuator comprises a shape memory material, and
    wherein the interface comprises a seal extending over a ring surface of the ring magnet; and a compression spring configured to urge the actuator in a direction toward the interface.

19. An assembly, comprising:
a substrate;
an active fluid component as defined in claim 18; and
a steel retaining disk arranged on the substrate to cooperate with the ring magnet, so that, when assembled, the fluid component is releasably attached to the substrate.

20. An assembly comprising:
a substrate and an active fluid component,
wherein the active fluid component includes an interface configured to be connected with the substrate in a fluid-tight manner, and a ring magnet with an actuator arranged in an interior of the ring magnet,
wherein the interface comprises a seal extending over a ring surface of the ring magnet; and
a steel retaining disk arranged on the substrate to cooperate with the ring magnet, so that, when assembled, the fluid component is releasably attached to the substrate through the seal between the steel retaining disk and the ring magnet.

\* \* \* \* \*